United States Patent [19]

Pirolli et al.

[11] Patent Number: 6,098,064
[45] Date of Patent: Aug. 1, 2000

[54] PREFETCHING AND CACHING DOCUMENTS ACCORDING TO PROBABILITY RANKED NEED S LIST

[75] Inventors: Peter L. Pirolli, San Francisco; James E. Pitkow, Palo Alto, both of Calif.

[73] Assignee: Xerox Corporation, Stamford, Conn.

[21] Appl. No.: 09/083,645

[22] Filed: May 22, 1998

[51] Int. Cl.$^7$ .................................................. G06F 17/30
[52] U.S. Cl. ...................................................... 707/2; 707/5
[58] Field of Search .................................... 707/2, 5, 10

[56] References Cited

U.S. PATENT DOCUMENTS

| | | | |
|---|---|---|---|
| 5,442,778 | 8/1995 | Pedersen et al. | 707/5 |
| 5,864,340 | 1/1999 | Bertram et al. | 345/352 |
| 5,991,755 | 11/1999 | Noguchi et al. | 707/3 |
| 6,009,452 | 12/1999 | Horvitz | 709/102 |

OTHER PUBLICATIONS

Anderson, John R. and Lael J. Schooler. "Reflections of the Environment in Memory," Psychological Science, vol. 2, No. 6, pp. 396–408, Nov., 1991.

Blue Squirrel. "WebWhacker 3.0 Reference Guide" from URL "http://www.bluesquirrel.com/whacker/." ForeFront Inc., 1995–1996. See in particular pp. 2–2–2–5, 4–2–4–17, 4–29–4–32.

Burell, Quentin, "A Simple Stochastic Model for Library Loans," Journal of Documentation, vol. 36, No. 2, pp. 115–132, Jun. 1980.

Cao, Pei et al. "Implementation and Performance of Integrated Application–Controlled File Caching, Prefetching, and Disk Scheduling," ACM Transactions on Computer Systems, vol. 14, No. 4, Nov. 1996, pp. 311–343.

Pirolli, Peter and Stuart Cad. "The Evolutionary Ecology of Information Foraging," Palo Alto Research Center Technical Report UIR–R97–01, Palo Alto, CA, 1997.

Pitkow, James E. "Characterizing World Wide Web Ecologies," Palo Alto Research Center Technical Report UIR–R97–02, Palo Alto, CA, Jun. 1997.

Schooler, Lael J. and John R. Anderson. "The Role of Process in the Rational Analysis of Memory," Cognitive Psychology, vol. 32, No. 3, pp. 219–250, Apr., 1997.

Schüetze, Hinrich. "Dimensions of Meaning," *Proceedings of Supercomputing '92*, pp. 787–796, Minneapolis, MN.

U.S. Patent Application No. 08/831,807 entitled "System for Predicting Documents Relevant to Focus Documents by Spreading Activation through Network Representations of a Linked Collection of Documents" to Peter L. Pirolli et al., filed April 9, 1997.

U.S. Patent Application No. 09/044,693 entitled "Method and Apparatus for Clustering a Collection of Linked Documents Using Co–Citation Analysis" to James E. Pitkow et al., filed Mar. 18, 1998.

U.S. Patent Application No. 09/053,616 entitled "Method and Apparatus for Pedicting Document Access in a Collection of Linked Documents" to Bernardo A. Huberman et al., filed Apr. 1, 1998.

*Primary Examiner*—David L. Robertson

[57] ABSTRACT

A method is presented for determining whether to prefetch and cache documents on a computer. In one embodiment, documents are prefetched and cached on a client computer from servers located on the Internet in accordance with their computed need probability. Those document with a higher need probability are prefetched and cached before documents with lower need probabilities. The need probability for a document is computed using both a document context factor and a document history factor. The context factor of the need probability of a document is determined by computing the correlation between words in the document and a context Q of the operating environment. The history factor of the need probability of a document is determined by integrating both the recency of document use and the frequency of document use.

20 Claims, 8 Drawing Sheets

PREFETCHING AND CACHING DOCUMENTS ACCORDING TO PROBABILITY RANKED NEED S LIST

BACKGROUND OF THE INVENTION

1. Field of the Invention

The present invention relates generally to a method for managing client and server access to electronically stored document repositories, and more particularly, to a method for determining which documents to prefetch and cache to improve document retrieval efficiency.

2. Description of Related Art

The World Wide Web (hereinafter the web) is an architectural framework for accessing documents (a term used interchangeably herein with web pages) stored on a worldwide network of distributed servers called the Internet. Documents stored on the internet are defined as web pages. The architectural framework of the web integrates web pages stored on the Internet using links. Web pages may consist of elements that include, but are not limited to, text, graphics, images, video, or audio. A web page which points to the location of another web page is said to be linked to that other web page. Links that are set forth in a web page usually take the form of a text fragment or an image. A user follows a link by selecting it.

In order to speed up access to a document that is selected by a user following a link, client computers can prefetch and cache documents. The number of documents that can be prefetched and cached depends on the amount of available cache on a client or server computer. Generally, the available resources on a client or server computer is small compared with the number of documents available on the web. In other words, only a small fraction of the expansive number of documents available on the web can be cached locally on a client or server computer. Consequently, the better a client or a server computer is able to identify documents that are most likely to be needed by a user, the better performance that user will experience while following linked documents or simply retrieving document from the web.

When using caching, the client computer initially examines whether the requested document is in local cache. If the document does exist in local cache and it is current (where current means that a newer version of the document does not exist), then the document is immediately delivered to the user. Otherwise, if the document is not in cache, the client computer fetches the document from a server located somewhere on the web. Depending on the document size and the available transmission rate, delivery of the document to the user could take a significant amount of time. The best way to optimize caching on a client computer is to define a set of documents that best predicts which documents are to be accessed by a user in the future. Those documents predicted to be in the set are stored in cache. Different methods for predicting which documents on the web best define the set of document that should be cached are known.

It is also known that the analysis of history (or past use) can be used to predict future use. Anderson et al., in "Reflections of the Environment in Memory," Psychological Science, 2, pp. 396–408, 1991, observed that specific mathematical laws can be used to predict future information needs from past events. Past events include news headlines, child language, and e-mail sources. In addition, Schooler et al., in "The Role of Process in the Rational Analysis of Memory," Cognitive Psychology, 32, pp. 219–250, 1997, found that these specific mathematical laws can be used to predict the result of controlled experiments on human memory. Furthermore, it has been found that these specific mathematical laws hold, to a good approximation, in predicting library circulation (see Burrell, "A simple Stochastic Model for Library Loans," Journal of Documentation, 36, p. 115–132, 1980) and in predicting web use (see Pitkow in "Characterizing World Wide Web Ecologies," Tech. Rep. UIR-R97-02, Palo Alto, Calif., 1997).

Caching on a client computer is beneficial because many of such systems are portable and are operated when they are disconnected from the network. When a laptop, or the like, is disconnected from the network, the user of the client computer is unable to retrieve documents that are stored on remote servers on the network. If the need for those documents was properly anticipated by the client computer before being disconnected from the network, the user of the client computer would be able to continue working as though having never been disconnected from the network. A related problem on client computers that are disconnected from the network is relegation. Because client computers often have limited memory (i.e., hard drives, etc.), the space required to stored documents anticipated to be used by the client computer must be created. Additional space is created by relegating (i.e., uploading) some of the files on the client computer to a less constrained storage device on the network.

Also known are computer programs that make browsing on the web more efficient. For example, the Web Wacker 2.0 by Blue Squirrel (found on the web at http://www.bluesquirrel.com/whacker/) is a utility that allows users to identify URLs to download (i.e., prefetch and cache) from the web onto client computers, and to specify the scheduling of those downloads (e.g., daily, weekly, etc.). Identification of the URLs to download can be performed at any time (e.g., while browsing other documents). Furthermore, the Web Wacker allows users to specify that downloads onto a client computer include URLs located within some specified depth of web links from the specified URLs. In addition, the Web Wacker can also be used on laptop computers for automatically downloading selected documents for later use before disconnecting from the network.

Systems such as the Web Wacker, however, require users to specifically identify which documents to be prefetched and cached or downloaded for later use. It would, therefore, be advantageous to provide a method for automatically predicting which documents are most likely to be needed by a user of a client computer. Using the predictions, documents can be prefetched (i.e., downloaded) from the network or relegated (i.e., uploaded) to the network, thereby efficiently managing a computers available memory resources.

SUMMARY OF THE INVENTION

In accordance with the invention there is provided a method, and apparatus therefor, for determining whether to prefetch to a client computer documents stored on server computers (hereinafter servers). In addition, the method is suitable for determining whether to prefetch and cache documents at servers or proxy servers. The servers may, for example, be electronic document repositories located on the Internet.

In accordance with one aspect of the invention, a "needs list" is defined for a client computer or server. The needs lists records all documents, whether resident locally or remotely that are referenced by the client computer or server. In operation, the client computer and the server record context data and history data of the referenced documents. Using the recorded context data and history data, the client computer and server compute a need probability for each document. The need probability provides a measure of the likelihood that a document will be needed on the client computer or the server.

In accordance with another aspect of the invention, the context data is used to compute a context factor which identifies the relative correlation between documents and a context Q of an operating environment. In the event an operating environment is a server or proxy server, then a collective context Q of the operating environment is defined as the union of all individual client contexts Q. In addition, the history data is used to compute a history factor that integrates both the recency and frequency of document use. The need probability for a document is computed by summing the weighted logarithms of the computed history factor and the computed context factor.

In accordance with yet another aspect of the invention, the needs list, which stores the need probabilities of each of document, is ordered according to document need probability. Those documents in the list of documents with the highest need probability are fetched from the remote servers on the Internet and stored in local cache. When there is insufficient space in local cache to store additional documents, local documents with the lowest need probabilities in the needs list are relegated to a server on the network. In the event a client computer is a laptop, documents are fetched and relegated before it is disconnected from the network.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION
A. Operating Environment

Figure 1:
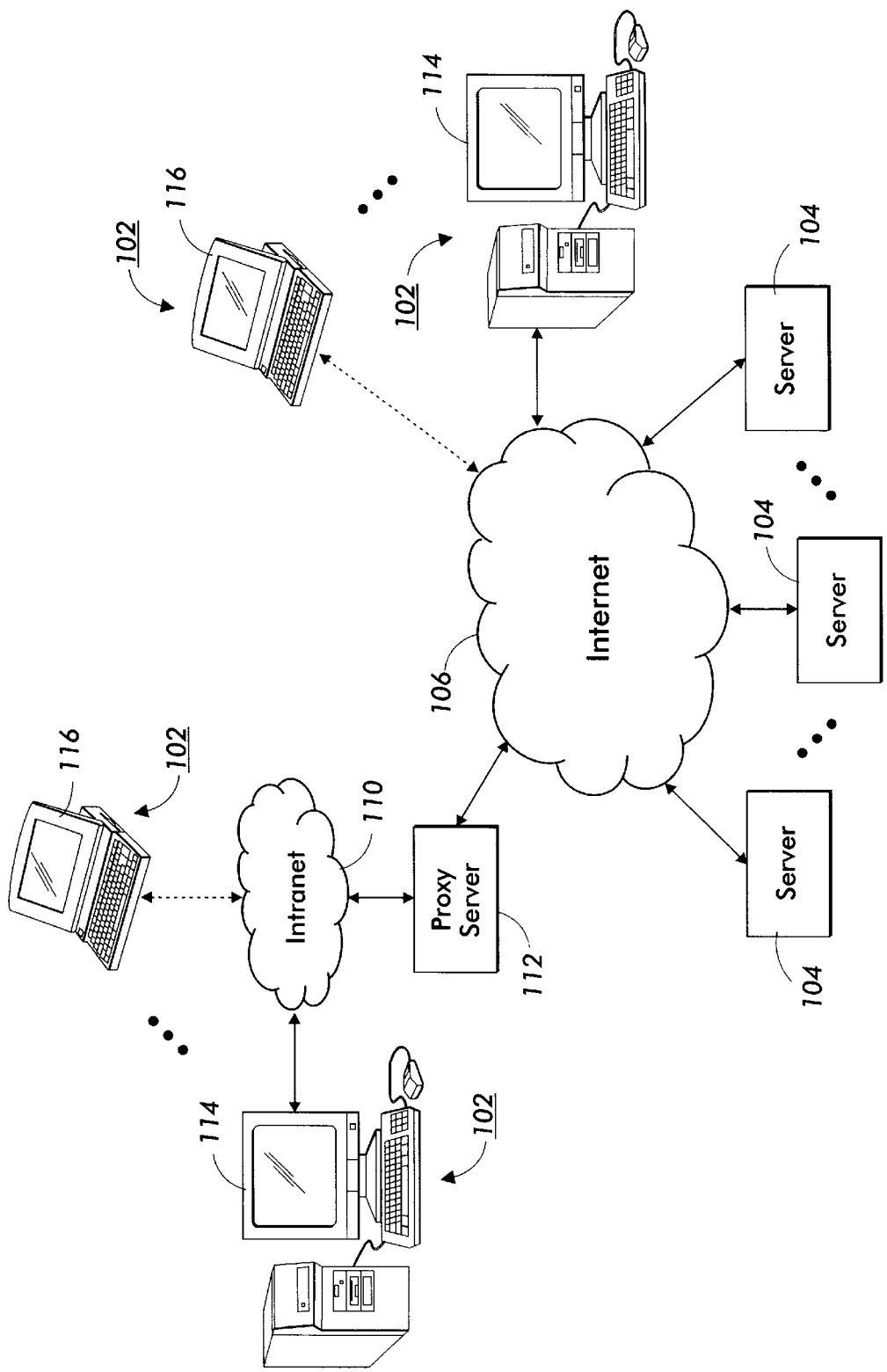
FIG. 1 illustrates an example of a distributed operating environment for performing the present invention.

Referring now to the drawings where the showings are for the purpose of describing the invention, FIG. 1 illustrates an example of a distributed operating environment for performing the present invention. In the distributed operating environment illustrated in FIG. 1, client computers 102, retrieve documents (i.e., web pages) stored on servers 104 for either viewing, storing, or printing. The client computers 102 are coupled to the servers 104 through internet 106. Some client computers 102, which are located on an intranet 110, communicate indirectly with servers 104 located on the internet 106 through a proxy server 112. The client computers 102 may consist of either workstations 114 or laptops 116. Generally, laptops 116, unlike workstations 114, are readily disconnected from either network 106 or network 110. When disconnected from either network, laptops 116 are unable to access documents stored on servers 104.

Figure 2:
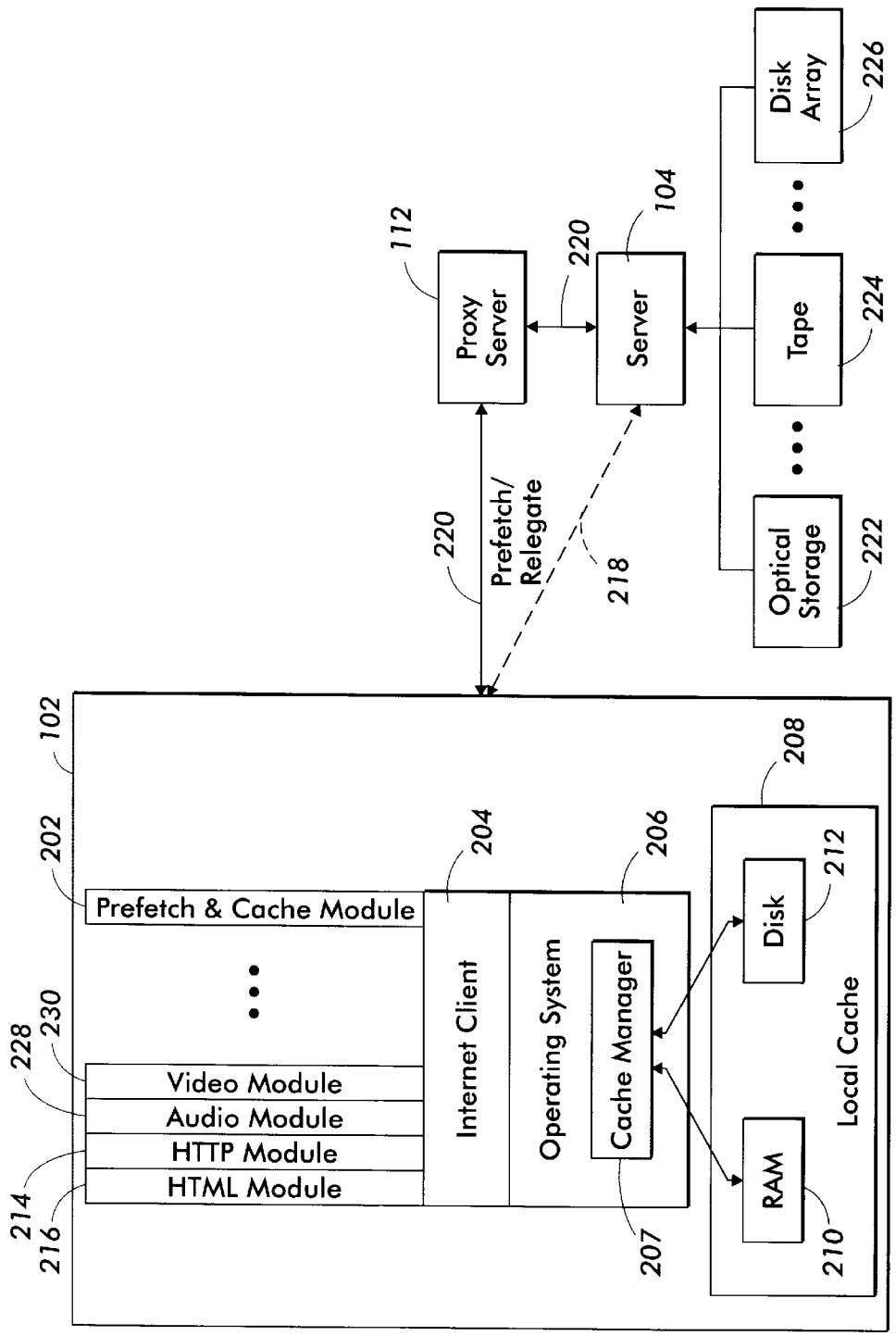
FIG. 2 illustrates a detailed block diagram of client computers in which a prefetch and cache module for carrying out the present invention operates.

FIG. 2 illustrates a detailed block diagram of the client computers 102 in which a prefetch and cache module 202 for carrying out the present invention operates. The prefetch and cache module 202 (hereinafter the "P&C module") forms one of a plurality of modules that are executed as needed by an internet client (or browser) 204. Examples of internet clients include the Navigator™ developed by Netscape Communications Corporation and the Explorer developed by Microsoft Corporation. The internet client 204 operates on a conventional operating system 206 such as Windows NT® by Microsoft Corporation or Mac OS™ 8 by Apple Computer Incorporated. The operating system 206 includes a cache manager 207, which is described in more detail below. Cache manager 207 stores and retrieves data from cache memory 208. The cache memory 208 includes RAM memory 210 and disk memory 212. It will be appreciated by those skilled in the art, however, that cache memory 208 may in addition include flash memory, floppy disk, or any other form of optical or magnetic storage.

The general function of the internet client 204 is to service user commands. The user commands that include fetching and displaying web pages stored at remote servers 104, invoke execution of the P&C module 202. In addition, fetching a web page from a remote server involves execution of an HTTP (Hyper Text Transfer Protocol) module 214. The HTTP module 214 implements a protocol that is used by the internet client 204 and either the proxy server 112 or the server 104 to communicate over the Internet. As illustrated in FIG. 2, web pages can either be fetched directly through server 104, as indicated by arrow 218, or indirectly through proxy server 112, as indicated by arrows 220. At the server 214, the web page may be stored on optical storage 222, tape 224, disk array 226, or some other form of memory not shown. Fetched web pages are displayed by the internet client 204 by executing an HTML (Hyper Text Markup Language) module 216. The HTML module 216 implements a protocol for defining the appearance of a web pages. In the event a web page contains audio or video, the modules 228 and 230, respectively, are executed. It will be appreciated by those skilled in the art that other modules can be added as needed to operate with the internet client 204.

Figure 3:
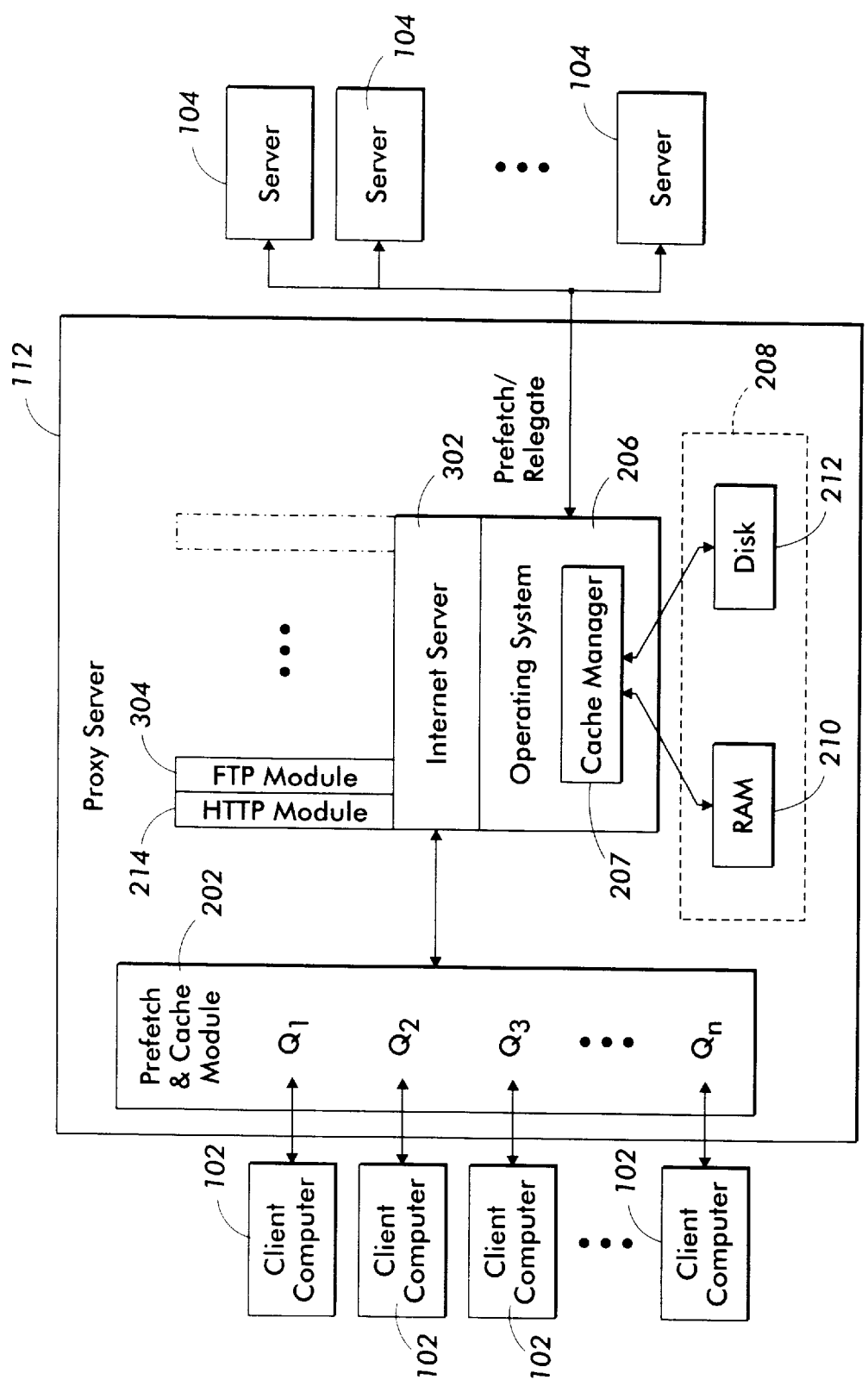
FIG. 3 illustrates a detailed block diagram of the proxy server shown in FIG. 1 in which a prefetch and cache module for carrying out the present invention operates.
Figure 4:
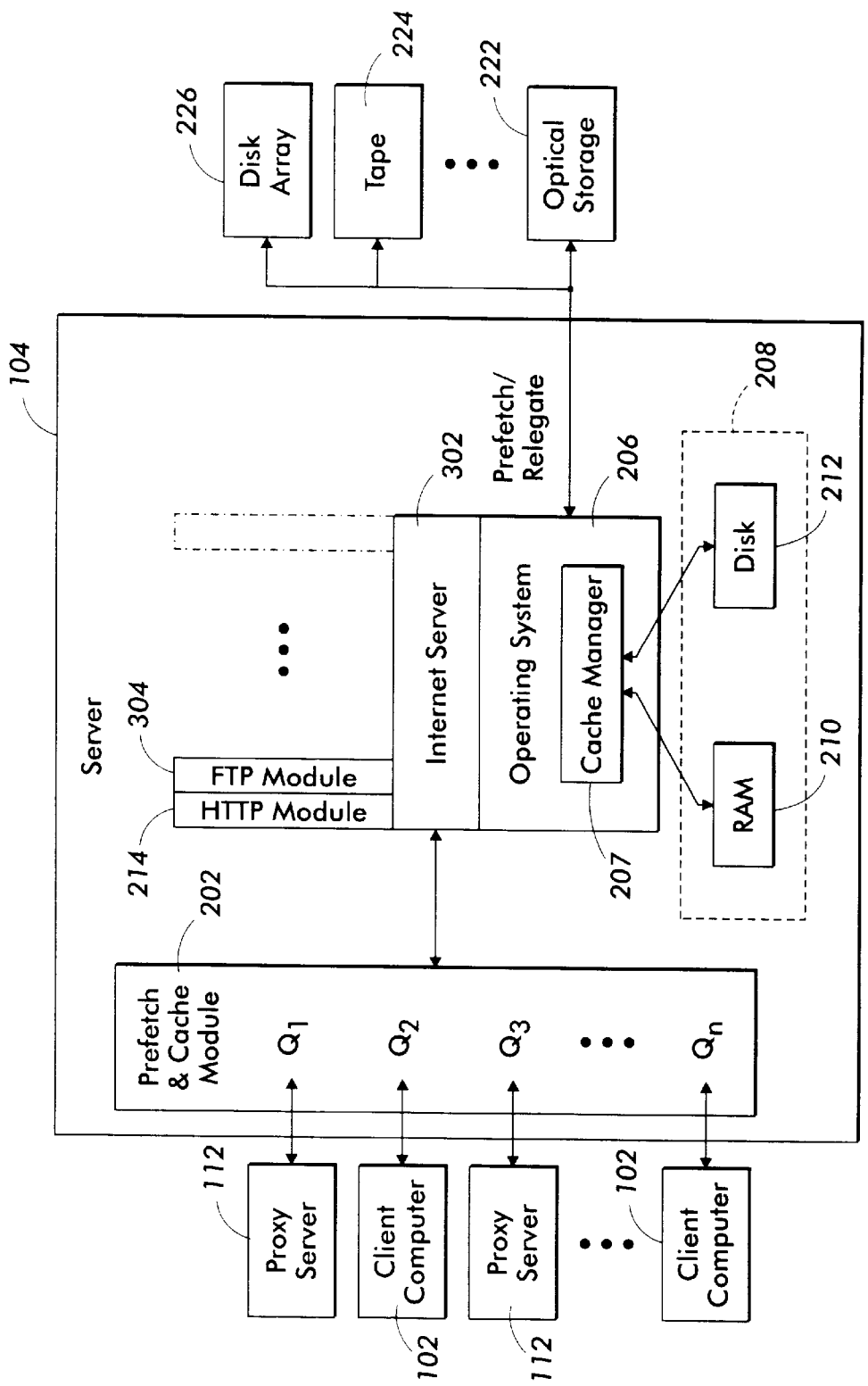
FIG. 4 illustrates a detailed block diagram of one of a servers shown in FIG. 1 in which a prefetch and cache module for carrying out the present invention operates.

FIG. 3 illustrates a detailed block diagram of the proxy server 112 shown in FIG. 1. The proxy server 112 includes an internet server 302 that operates on a conventional network operating system 206. The internet server 302 services network requests from client computers 102 using HTTP module 214 and FTP module 304. The internet server 302 communicates with the P&C module 202 for determining what documents to fetch from servers 104 or local cache 208. FIG. 4, which is similar to FIG. 3, illustrates a detailed block diagram of one of the servers 104 shown in FIG. 1. Unlike the proxy server 112 shown in FIG. 3, the server 104 shown in FIG. 4 communicates with client computers 102 as well as proxy servers 112. The distinction between the P&C module 202 of the client computer 102 and the servers 112 and 104 is set forth in Section D below.

B. Overview of Method for Prefetching and Caching Documents

In accordance with the invention, the P&C module 202 optimizes the utility of the internet client 204 operating on client computer 102 (and internet server 302 operating on servers 104 and 112) by prefetching and storing in local cache 208 those documents which are most likely to be accessed by a user while browsing web pages on the Internet. In operation, the local cache 208 becomes a local repository of documents which can be readily accessed by the user of a client computer 102. The decision to prefetch and cache a document stored on a remote server 104 located on the internet 106 is made by comparing document (or web page) need probabilities.

The need probability of a document is the likelihood that the document is going to be needed by a user at some point in time in the future. Computing a document's need probability involves examining the context and the history of a document's use. Generally, the context of a document's use represents the user's "contextualized" degree-of-interest, whereas the history of a document's use represents the user's "intrinsic" degree-of-interest. The "contextualized" and "intrinsic" degree-of-interest for a document changes over time as the interest of the user or community of users changes.

The context of a document's use is quantified in a document's need probability using a "context factor." Determining the context factor involves assessing the content of a current set of documents in use as well as a focus set of documents specified by a user. The current set of documents are those documents which the user has accessed directly or indirectly while operating the client computer. In addition, determining the context factor may involve assessing the content of a focus set of documents. The focus set of documents are those documents which are specified directly or indirectly by the user. For example, the focus set of documents may be defined using all of the linked documents referenced in the current set of documents.

The history of a document's use is quantified in a document's need probability using a "history factor." Determining the history factor involves tracking the ongoing history of documents that are referenced by a user over time on the client computer 102. In accordance with the present invention, tracking the history of user referenced documents is performed by tracking when a document is referenced (i.e., recency) and how frequently a document is referenced (i.e., frequency). Unlike known prefetching and caching techniques which compute the recency of use or the frequency of use in isolation, the present invention determines a history factor by integrating the recency of use with the frequency of use together.

Prefetching and caching documents advantageously improves the utility of the internet client for two reasons. First, when a web page that is requested by a user that has already been prefetched and stored in local cache 208, retrieval of the web page from a remote server 104 becomes unnecessary. Consequently, local caching of web pages improves the overall speed with which a user can browse collection of linked documents. When a web page is found in local cache, moving from one linked document to the next is performed with little if any perceivable delay to the user.

Second, prefetching and caching documents allows client computers, such as laptops 116, to continue to browse documents of interest even when they are disconnected from the networks 106 and 110. Because the P&C module 202 determines which documents stored on remote servers 104 are of particular interest to a user of a client computer 102, the P&C module can download those documents which the user will most likely access even though the user's client computer is no longer connected to networks 106 or 110.

C. Client Computer Prefetching and Caching of Documents

Figure 5:
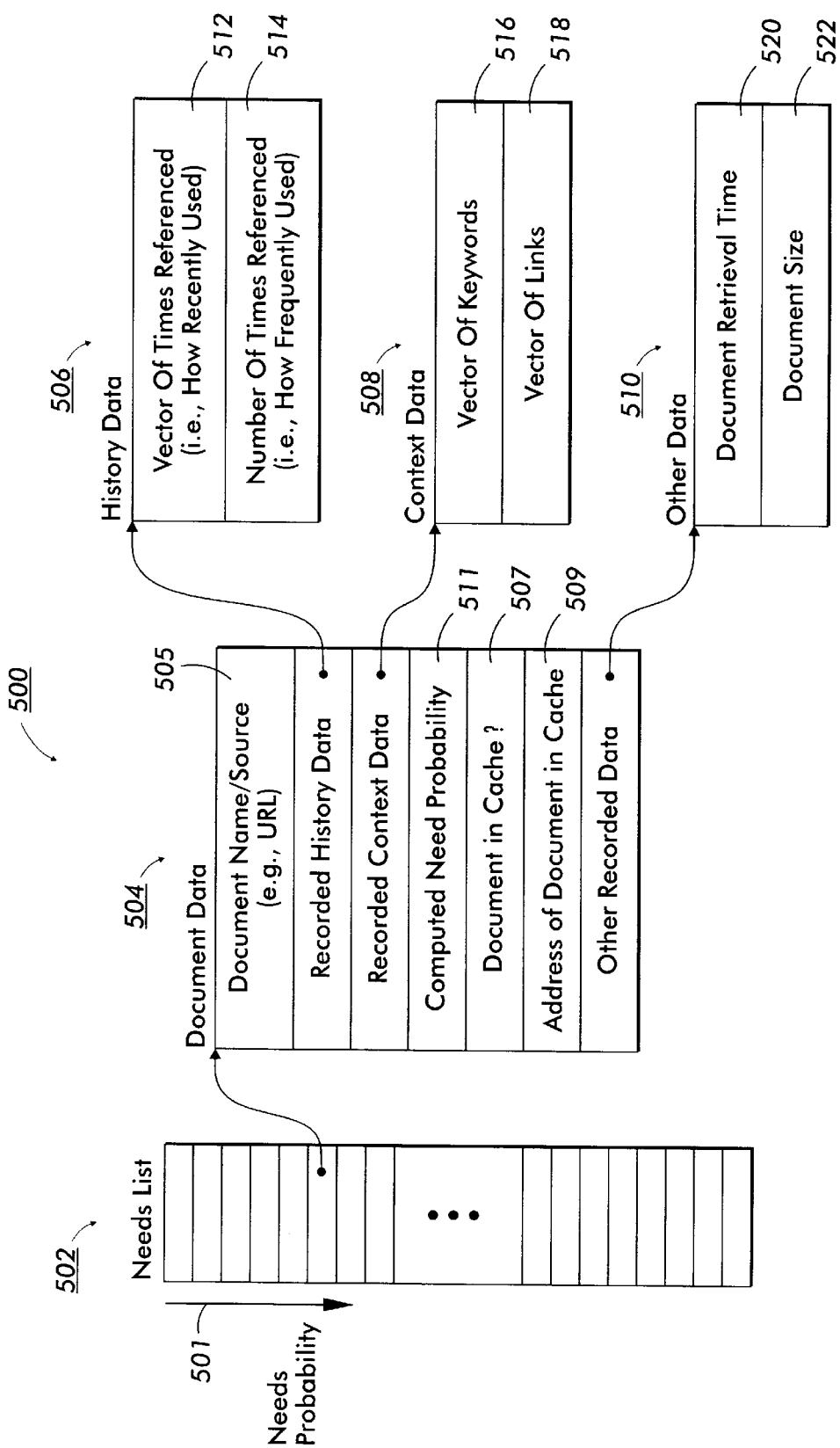
FIG. 5 illustrates an example of a data structure which is used to compute and sort the need probabilities of documents accessed by a user of a client workstation.

FIG. 5 illustrates an example of a data structure which is used to compute and sort the need probabilities of documents accessed by the user of a client workstation 102. The data structure, which is indicated generally by reference number 500, includes a needs list 502. In one embodiment, the needs list 502 is an array of pointers, with each pointer in the array pointing to document data 504. Each element of document data 504, which is discussed in detail below, includes pointers to history data 506, context data 508, and other data 510. Each of the data structures 502, 504, 506, 508, and 510 are stored in a memory of the client computer 102 such as RAM 210 or disk 212.

Figure 6:
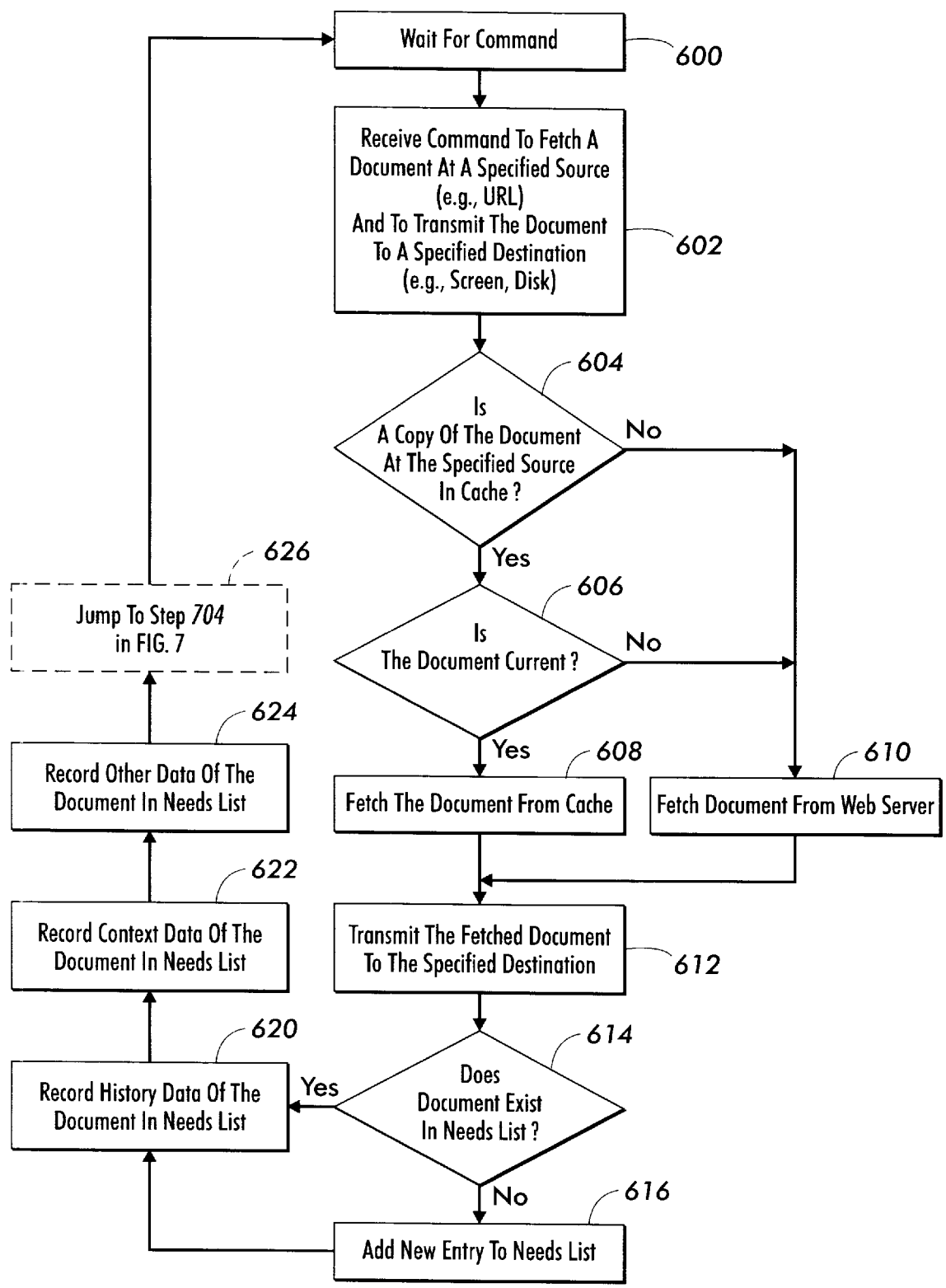
FIG. 6 is a flow diagram which sets forth the steps performed by the prefetch and cache module to develop a needs list.

FIG. 6 is a flow diagram which sets forth the steps performed by the P&C module 202 to develop the needs list 502. At step 600, the P&C module 202 waits for a command to be issued from the internet client 204. A command may be issued after a document is requested by a user. Document requests can be in the form of a mouse click or some other user initiated command. Commands issued by the internet client 204 are received by the P&C module 202 at step 602. The commands include a request to fetch a document at a specified URL (Uniform Resource Locator). A URL of a document has three parts: the protocol (e.g., http), the name or address of server on which the document is located, and the local name of the document. In addition, the command includes a request to transmit the fetched document to a specified output destination of the client computer 102, such as a display, a storage device, or a printing system.

At step 604, the P&C module 202 determines whether the document identified by the URL specified by the user command exists in local cache 208. In one embodiment, this step is performed by determining whether the document exists in the needs list 502. If the document identified by the URL does exist in the needs list 502, then the boolean variable 507 that identifies whether the document is in local cache is examined. In the event the boolean variable 507 indicates the document is in local cache, the location of the document in cache is identified by examining the cache address variable 509, which forms part of document data 504.

If the document requested at step 602 is found to be resident in local cache 208, a determination is made at step 606 as to whether the document is current. If the document is current at step 608, then the document is fetched from local cache 208. However, if the document is not current at step 606, then the document is fetched from the server identified by the URL of the document at step 610. At step 612, whether fetched from local cache 208 or a remote server 104, the requested document is transmitted to the output destination specified at step 602. Subsequently, if the document is found to be recorded in the needs list at step 614, then step 620 is performed; otherwise, step 616 is performed. At step 616, the URL of the document is added as a new entry to the document needs list. Adding a new entry in the document needs lists includes the act of recording the document's name and source (i.e., URL) in field 505 of the document data structure 504.

At step 620, data in the history data structure 506, which forms part of the document data structure 504, is updated in the needs list 502. Part of the data recorded in the history data structure 506 is a vector of times referenced 512, which includes the last time the document was referenced by the user of the internet client 204. Thus, in updating the vector 512, the current time at which the document is referenced is added to an entry in the vector 512. In addition, a variable storing the number of times referenced 514 is incremented. The vector of times referenced 512 and the variable indicating the number of times referenced 514 provides information for determining how recently and how frequently the document was referenced by the user.

At step 622, data in the context data structure 508 of the document data structure 504 is recorded in the needs list 502. Forming part of context data structure 508 is a vector of keywords 516 and a vector of links 518. The vector of keywords 516 is filled with words from the document that best represent the content of the document retrieved by the user. The vector of links 518 is filled with the URL of documents that are referenced in the document being retrieved by the user. The recorded context data 508 is used to determine whether the current document is related to other documents that have or have not been retrieved by the user.

At step 624, other data 510 is recorded for the currently fetched document. The other data can include storing the time that it took to retrieve the document in variable 520 and the size of the document in variable 522. Finally at step 626, a determination is made as whether to cache the document in local cache 208 by issuing a command to update the local cache. In one embodiment, this determination is made by executing step 704 shown in FIG. 7. After performing step 624, the P&C module 202 waits for a new command at step 600.

Figure 7:
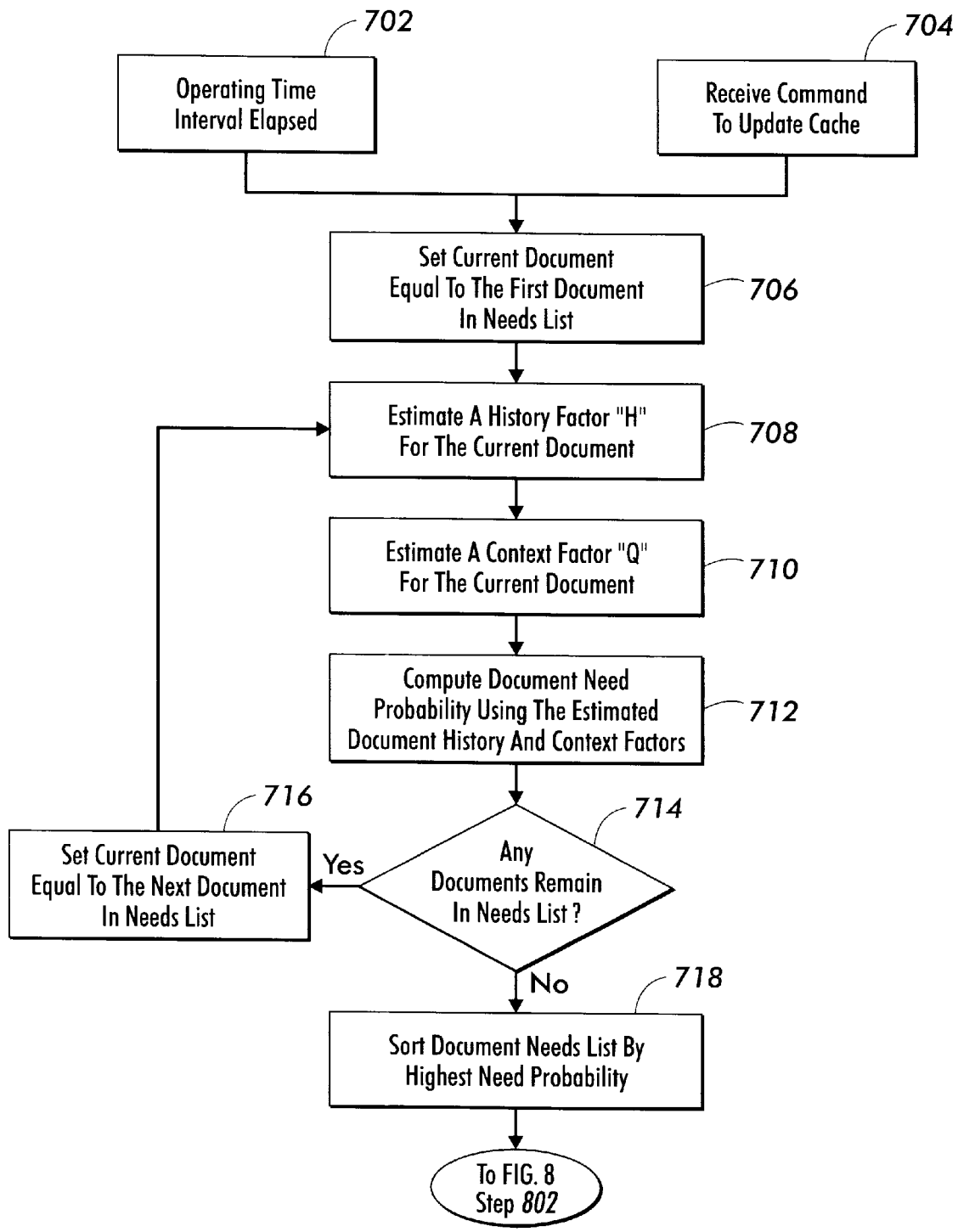
FIGS. 7 and 8 are flow diagrams which sets forth the steps performed by the prefetch and cache module to update local cache using the needs list.
Figure 8:
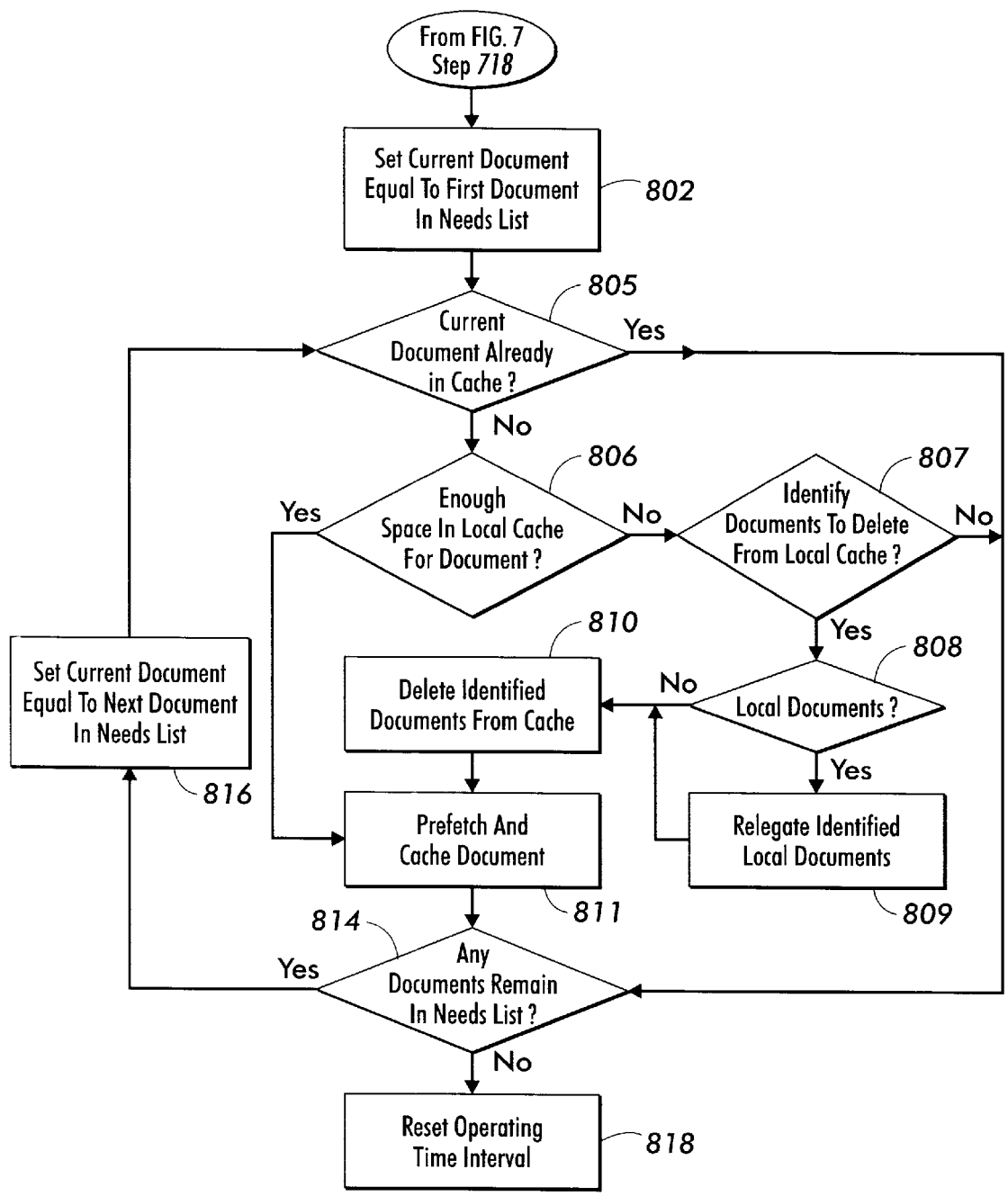

FIGS. 7 and 8 are flow diagrams which sets forth the steps performed by the P&C module 202 to update local cache 208 using the needs list 502. The flow diagrams are begun after either having an operating time interval expire at step 702 or after receiving a command to update the local cache at step 704. The operating time interval that expires at step 702 is preset either by the client computer or a user of the client computer. In one embodiment, the operating time interval expires once every twenty-four hours. The command received at step 704 can originate from a user of the client computer or another module operating inside the client computer. After performing either step 702 or step 704, the steps for updating local cache continue by performing step 706. At step 706, a current document in the needs list 502 is defined by the first document in the needs list 502. The steps 714 and 716 sequentially step through each document in the needs list 502. For each document sequentially stepped through in the needs lists, the steps 708, 710, and 712 are performed.

Steps 708 and 710 concern the manner in which the history factor ($P_H$) and the context factor ($P_C$) are computed. How the history and context factors are computed relates to the manner in which to define a need probability that is a function of both the history of events relating to documents used by a client computer and the relationship of the current context of those documents and others stored on the Internet. The motivation for defining a need probability that combines a history and a context factor is to accelerate the delivery of information to users.

At step 708, the history factor for the current document is estimated. In one embodiment, the history factor is approximated empirically using the expected values of the need probabilities of the history factor ($P_H$), which can otherwise be represented using a needs odds (P/(1−P)). Accordingly, the predicted needs odds of the history factor for a particular document (i) can be approximated empirically using the following power function:

$$\frac{\hat{P}_i}{1-\hat{P}_i} = \alpha D_i^{-\beta} F_i^{-\gamma},$$

where, $$\frac{\hat{P}_i}{1-\hat{P}_i}$$

is the predicted needs odds for a document per day;

$D_i$ is the number of days since the document was last accessed (i.e., recency);

$F_i$ is the frequency of accesses of the document over a period of days; and

αβγ are parameters from a population of documents that are estimated using, for example, regression analysis.

In accordance with one aspect of the invention, the power function provides a single value which integrates both recency and frequency of document use. This single value can be used on its own to represent document need. More specifically, the power function provides a method for determining whether documents should be cached by analyzing the history of document use over time. Computing the history factor as defined above is computed using the vector of times referenced 512 to determine the number of days since the document was last accessed (i.e., recency $D_i$) and the frequency of access of the document over a period of days (i.e., frequency or $F_i$). Once these two values are determined, the predicted needs odds for a document per day can be computed using the equation set forth above.

Furthermore, taking the log of the needs odds, the power function can be represented using the following linear equation:

$$\log\left(\frac{\hat{P}_i}{1-\hat{P}_i}\right) = \log(\alpha) - \beta D_i - \gamma F_i$$

A method for collecting and fitting this equation to data collected from web proxy logs and web sites is disclosed by Pitkow in "Characterizing World Wide Web Ecologies," Tech. Rep. UIR-R97-02, Palo Alto, Calif., 1997, which is incorporated herein by reference. Furthermore, Baysian methods for initializing and incrementally updating estimates of the equation are disclosed by Anderson in "Rules of the Mind," Hillsdale, N.J., Lawrence Erlbaum Associates, 1993.

At step 710, the context factor for the current document is estimated. The context factor is empirically approximated by first defining a context Q of an operating environment, such as a client computer, and then by using the context Q to estimate the probability that a document is relevant to a user. In one embodiment, the context Q is defined by a set of documents. A user of the client computer can identify the set of documents by identifying a specific file location, such as a subject folder or a user workspace. Alternatively, the set of documents can be automatically identified by recording the user's "N" most recently browsed documents, where "N" is an integer that is either selected by the user or simply defaulted by the client computer.

In addition, a set of documents, no matter how they are defined, can be automatically extended and developed into a larger set. For example, a set of documents can be extended to include those documents that are within a specified link radius of all browsed documents. In this example, the specified link radius could be determined with a model of the user's Web surfing behavior as disclosed in European patent application EP 0947936 A2 (entitled: "Method And Apparatus For Predicting Document Access In A Collection Of Linked Documents"). Alternatively, the set of documents could be automatically extended by adding those documents that are in the user's most frequently browsed paths. In an alternate embodiment, the context Q is defined by a set of keywords that is defined using a query. The query is used to sample the context of recently browsed documents. For example, the vector of keywords 516 can be formed by using the query to sample the context of a browsed document. The query may be defined by a user or alternatively developed over time using a cluster-based techniques for searching text documents such as disclosed in U.S. Pat. No. 5,442,778.

Once the context Q is defined for a client computer 102, the probability that a document has a relevant context is estimated. The estimate of the probability of a document being relevant given the context Q is defined as the document's context factor ($P_C$). In one embodiment, the context factor ($P_C$) is computed using inter-word correlations. That is, the context factor ($P_C$) is computed by examining how closely words defining the context Q are correlated to words in the vector of keywords 516 for a document. One method for computing inter-word correlations is disclosed by Schuetze, in "Dimensions of Meaning," Proceedings of the Supercomputing 1992, pp. 787–796, Minneapolis, Minn., which is herein incorporated by reference.

In another embodiment, the context factor ($P_C$) is computed using spreading activation networks (i.e., log likelihood's). Spreading activation networks arrange web pages as nodes in graph networks that represent usage, content, and hypertext relations among web pages. An example of spreading activation is disclosed in U.S. Pat. No. 5,835,905 (entitled: "System For Predicting Documents Relevant To Focus Documents By Spreading Activation Through Network Representations Of A Linked Collection Of Documents"), which is incorporated herein by reference. In yet another embodiment, the context factor ($P_C$) is computed using vector similarities from co-citation or clustering analysis. Co-citation analysis involves identifying how many times pairs of documents are cited together. An example of co-citation analysis is disclosed in U.S. Pat. No. 6,038,574 (entitled: "Method And Apparatus For Clustering A Collection Of Linked Documents Using Co-Citation Analysis"), which is incorporated herein by reference.

At step 712, a need probability for the document is computed and stored in the document data structure 504 as computed need probability variable 511. In the preferred embodiment, the need probability for a document is a combination of both the history factor estimated at step 708 and the context factor estimated at step 710. As set forth above, a document's need probability ($P_T$) is computed at step 712 using both a history factor ($P_H$) and a context factor ($P_C$). In accordance with one aspect of the invention, the document need probability ($P_T$) is computed by summing the weighted logarithms of the estimated history factor ($P_H$) and the estimated context factor ($P_C$) using the following equation:

$$P_T = w_1 \log(P_H) + w_2 \log(P_C),$$

where $w_1$ and $w_2$ are weights;

$P_H$ is the predicted need for a document per day; and $P_C$ is the predicted relevance of a document.

In a preferred embodiment, the weights $w_1$ and $w_2$ are equal so that the history factor and the context factor contribute equally to the needs probability ($P_T$). It will be appreciated by those skilled in the art, however, that the weights $w_1$ and $w_2$ can be defined so that disproportionate percentages of the history factor and the context factor document are used to define the needs probability $P_T$. In another embodiment, the weight $w_2$ is set equal to zero, thereby providing a predicted need probability for a document that is solely based on the document's recency and frequency of use. In yet another embodiment, the other data 510, such as document retrieval time 520 and document size 522, is factored into the equation for computing document need probability ($P_T$).

Once the steps 708, 710, and 712 have been performed for each entry in the need list 502, step 718 is performed. At step 718, the needs list is sorted by highest need probability. That is, those documents with the greatest probability of being needed by the user are located at the top of the list and those documents with less need are located at the bottom of the list. As illustrated in FIG. 5 by arrow 501, the needs list 502 is sorted by descending values of computed need probability 511. As discussed below with reference to the steps in FIG. 8, the P&C module 202 proceeds to fill cache 208 (shown in FIG. 2) with those documents having the highest need probability in the sorted needs list 502.

Referring now to FIG. 8, a current document in the sorted needs list 502 is set to reference the first document in the needs list, at step 802. The steps 814 and 816 sequentially assigning each document in the needs list 502 to be the current document. For each document in the needs list that is referenced as a current document, selected ones of the steps 805–811 are performed. At step 805, a determination is made as to whether the current document is in cache. If the current document is in cache, then step 814 is repeated; otherwise, step 806 is performed. At step 806, a determination is made as to whether there exists sufficient space in cache for the document to reside. If there is insufficient space, then step 807 is performed to determine whether it is possible to delete documents from local cache 208 to increase the amount of local cache available. However, if there is sufficient space in cache then step 812 is performed. At step 812, the current document is prefetched and stored in local cache 208.

At step 807, documents in the needs list with a need probability below some threshold amount are identified to be deleted from local cache. If no documents are identified at step 807 then step 814 is repeated; otherwise, step 808 is performed. At step 808, if the documents identified at step 807 are identified as local documents, then step 809 is performed; otherwise, step 810 is performed. Documents which are local to a client workstation have a URL 505 value that contains a document source field that is equivalent to the local operating computer. At step 809, local documents identified to be deleted from local cache are relegated to a server. That is, at step 809, the local document stored in local cache is copied onto on a remote server. Once the local document is stored on the remote server, its URL 505 in the need list is updated to reflect its new location. After performing step 809, the document stored in local cache is deleted at step 810. Whether originally stored locally or remotely, the document in cache variable 507 is reset to reflect the document's new status. Once there is sufficient local cache by deleting documents at step 810, step 812 is performed. When there are no remaining documents in the needs list to be processed, the operating time interval is reset at step 818, at which point the routine terminates.

In an alternate embodiment, management of prefetching and caching of documents in the needs list is performed using a controlled aggressive policy. An example of a controlled aggressive policy is disclosed by Cao et al. in "Implementation and Performance of Integrated Application-Controlled File Caching, Prefetching, and Disk Scheduling," ACM Transactions on Computer Systems, 14, 311–343. In addition to the controlled aggressive policy, limited batch scheduling and two-level (or client-server) base management may also be adopted to manage the prefetching and caching of documents in the needs list. In limited batch scheduling, the client computer 102 issues batches of prefetch requests when the computer is idle to a server 104. Once the server 104, receives the batch request, the server delivers the documents in order of greatest need probability. Two-level base management allows client computers 102 to manage their own prefetching and caching, while the servers 104 define a global cache allocation policy.

D. Proxy Server and Server Prefetching and Caching of Documents

The method set forth above for prefetching and caching documents at a client computer can be readily scaled to operate on a proxy server 112 or server 104. However, unlike the P&C module 202 in the client computer 102, the P&C module 202 in the proxy server 112 (shown in FIG. 3) and server 104 (shown in FIG. 5) compute a collective context Q for a community of client computers as opposed to an individual context Q for a single client computer. The collective context Q is computed by pooling many client contexts together. In one embodiment, the collective context is defined by computing the union set of all of the individual contexts $Q_1, Q_2, Q_3 \ldots Q_n$ of individual client fetch requests. This collective context Q is then applied across all users of a server or proxy server. In operation, the P&C module 202 in the proxy server 112 and the server 104 record a needs list for the community of clients making requests for documents to the server using an HTTP module 214 and an FTP module 304.

More specifically, the proxy server 112 services a community of users that share some interests or some mission. For instance, the proxy server may be used by members of a workgroup or organization. In a sense, a proxy server is like a librarian who mediates between a community of book users (i.e., intranet users) and library holdings (i.e., documents stored on the Internet). Not only does the librarian try to understand the interest of the community, often the librarian tries to configure access to the holdings to better fit those interests. In accordance with one aspect of the invention, need probabilities are computed for documents accessed by computers of different users. By prefetching and caching those documents with the greatest need probability, the proxy server tunes its local cache to retain those documents which are most needed by the community of users.

Similar to the proxy server 112, the server 104 services a community of users. However, unlike the proxy server 112, the server 104 is coupled to multiple storage devices such as a disk array 226, a tape 224, or optical storage 222, which are shown in FIG. 4. In addition, the server may receive document fetch requests from a proxy server 112 or individual client computer 102. The time expended before the document is delivered to the client requesting the document depends on which storage device the requested document is stored. For example, a document retrieved from a disk drive is orders of magnitude faster than a request for the same document stored on magnetic tape. Prefetching and caching documents on storage devices by their need probability in local cache of a server, advantageously minimizes the retrieval latency of different storage devices by anticipating the needs of the community of users.

E. Summary

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

Furthermore, it will be appreciated by those skilled in the art that the method for prefetching and caching of the present invention need not be limited to documents resident on a networks such as the Internet. Instead, the method for prefetching and caching documents may also be applied to any file retrieved by a client computer. Examples of files other than documents may include executable programs or program data files.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for determining with a computer whether to prefetch and cache documents, comprising the steps of:

recording context data and history data of the documents in a needs list stored in a memory of the computer; said recording step being performed each time a document request is received by the computer;

computing a need probability for the documents recorded in the needs list stored in the memory; said computing step computing the need probability for the documents as a function of the recorded context data and history data of the documents; and identifying those documents in the needs list with the greatest computed need probability to be prefetched and cached in the memory of the computer.

2. The method according to claim 1, wherein said step of recording history data further comprises the steps of:

recording in the needs list how recently each document is referenced; and recording in the needs list how frequently each document is referenced.

3. The method according to claim 2, wherein said step of recording context data further comprises the steps of:

recording keywords of each document referenced in the needs list; and recording links of each document referenced in the needs list.

4. The method according to claim 3, wherein said computing step further comprises the steps of:

estimating a history factor for predicting how likely each document recorded in the needs list is to be needed; and estimating a context factor for predicting how relevant each document in the needs list is given a context Q of an operating environment.

5. The method according to claim 4, wherein said computing step computes the need probability for each document in the needs list by summing the weighted logarithms of the estimated history factor and the estimated context factor.

6. The method according to claim 4, wherein said estimating step estimates the history factor according to the following equation:

$$\frac{\hat{P}_i}{1-\hat{P}_i} = \alpha D_i^{-\beta} F_i^{-\gamma},$$

where, $$\frac{\hat{P}_i}{1-\hat{P}_i}$$

sets forth a predicted needs odds for a document per day;

$D_i$ sets forth how many days since a document was last accessed;

$F_i$ sets forth how frequently a document is accessed over a period of days; and αβγ set forth parameters that are estimated from a population of documents.

7. The method according to claim 4, further comprising the step specifying the context Q using a pre-identified set of documents.

8. The method according to claim 7, further comprising the step of expanding the context Q using a set of documents defined by those documents which are within a specified link radius of all documents in the set of pre-identified documents.

9. The method according to claim 4, further comprising the step of specifying the context Q for a sever by computing a union set of individual client contexts.

10. The method according to claim 4, wherein said estimating step estimates the context factor by computing correlation between the context Q and the recorded keywords of a document.

11. The method according to claim 1, further comprising the steps of:

fetching from a server documents in the needs list, beginning with those documents having the highest computed need probability; and responsive to said fetching step, storing the fetched document in the memory of the computer.

12. The method according to claim 11, wherein said fetching step is performed before disconnecting the computer from a network.

13. The method according to claim 1, wherein said recording step is performed by a client computer while retrieving documents stored on servers coupled to a network.

14. The method according to claim 1, further comprising the steps of:

identifying documents stored in the memory of the computer that are no longer necessary; and relegating those identified documents to a server on a network to increase memory available for storing documents on the computer.

15. A method for determining with a computer whether to prefetch and cache documents, comprising the steps of:

recording frequency data and recency data of the documents in a needs list stored in a memory of the computer; said recording step recording in the needs list how recently the document is referenced and how frequently the document is referenced when a document request is received by the computer;

computing a need probability for the documents recorded in the needs list; said computing step computing the need probability for the documents as a function of the recorded frequency data and recency data; and identifying those documents in the needs list with the greatest computed need probability to be prefetched and cached in the memory of the computer.

16. The method according to claim 15, further comprising the step of recording context data for predicting relevancy of each document in the needs list.

17. The method according to claim 15, wherein said computing step computes the need probability for each document in the needs list using the following equation:

$$\frac{\hat{P}_i}{1-\hat{P}_i} = \alpha D_i^{-\beta} F_i^{-\gamma},$$

where, $$\frac{\hat{P}_i}{1-\hat{P}_i}$$

sets forth a predicted needs odds for a document per day;

$D_i$ sets forth how many days since a document was last accessed;

$F_i$ sets forth how frequently a document is accessed over a period of days; and αβγ set forth parameters that are estimated from a population of documents.

18. An apparatus for determining whether to prefetch and cache documents, comprising:

a memory for storing a needs list of documents;

means for recording context data and history data of the documents in the needs list; said recording means recording the context data and the history data when a document request is received;

means for computing a need probability for the documents recorded in the needs list; said computing means computing the need probability for the documents as a function of the recorded context data and history data of the documents; and means for identifying those documents in the needs list with the greatest computed need probability to be prefetched and cached in said memory.

19. The apparatus according to claim 18, wherein said recording means further comprises:

means for recording, in the needs list, how recently each document is referenced; and means for recording, in the needs list, how frequently each document is referenced.

20. The apparatus according to claim 18, wherein said recording means further comprises:

means for recording, in the needs list, keywords of each document referenced; and means for recording, in the needs list, links of each document referenced.

* * * * *